(12) United States Patent
Zhang

(10) Patent No.: US 11,376,748 B2
(45) Date of Patent: Jul. 5, 2022

(54) WHEEL HUB CARRYING MANIPULATOR

(71) Applicant: CITIC Dicastal CO., LTD., Qinhuangdao (CN)

(72) Inventor: Liwei Zhang, Qinhuangdao (CN)

(73) Assignee: CITIC DICASTAL CO., LTD., Qinhuangdao (CN)

( * ) Notice: Subject to any disclaimer, the term of this patent is extended or adjusted under 35 U.S.C. 154(b) by 259 days.

(21) Appl. No.: 16/688,061

(22) Filed: Nov. 19, 2019

(65) Prior Publication Data
US 2020/0338756 A1 Oct. 29, 2020

(30) Foreign Application Priority Data

Apr. 29, 2019 (CN) .......................... 201910353227.7

(51) Int. Cl.
| | |
|---|---|
| B25J 15/08 | (2006.01) |
| B25J 15/00 | (2006.01) |
| B25J 9/10 | (2006.01) |
| B25J 9/14 | (2006.01) |
| B25J 15/02 | (2006.01) |

(52) U.S. Cl.
CPC ............ B25J 15/08 (2013.01); B25J 9/1065 (2013.01); B25J 9/144 (2013.01); B25J 15/0047 (2013.01); B25J 15/022 (2013.01)

(58) Field of Classification Search
CPC ..... B25J 9/10; B25J 9/106; B25J 9/144; B25J 9/1065; B25J 9/1612; B25J 15/08; B25J 15/0047; B25J 15/022; B66C 1/42; B66C 1/54

See application file for complete search history.

(56) References Cited

U.S. PATENT DOCUMENTS

| | | | | |
|---|---|---|---|---|
| 3,262,593 A | * | 7/1966 | Hainer ....................... | B25J 5/04 414/619 |
| 3,995,746 A | * | 12/1976 | Usagida .................. | B66C 23/10 414/738 |
| 4,548,544 A | * | 10/1985 | Van Appledorn ........ | B21J 13/10 198/750.11 |
| 4,659,278 A | * | 4/1987 | Doege ..................... | B25J 9/046 248/325 |
| 4,796,861 A | * | 1/1989 | Petty ....................... | B66C 23/48 254/124 |
| 7,204,168 B2 | * | 4/2007 | Najafi ..................... | A61B 34/35 74/471 XY |
| 8,388,035 B2 | * | 3/2013 | Kamon ................ | B25J 15/0266 294/213 |

(Continued)

FOREIGN PATENT DOCUMENTS

| | | | | |
|---|---|---|---|---|
| CN | 107856029 A | * | 3/2018 | |
| CN | 108115712 A | * | 6/2018 | |

(Continued)

*Primary Examiner* — Dean J Kramer
(74) *Attorney, Agent, or Firm* — IPro, PLLC

(57) ABSTRACT

The present disclosure provides a wheel hub carrying manipulator which comprises a stand column, a forearm driving device and a claw hand device, wherein the stand column is fixed in the vertical direction, the claw hand device can drive a claw hand assembly to clamp and release a wheel hub through a connecting rod, by the manipulator, assembly line operation can be realized, the production efficiency can be greatly improved, the structure is simple, and the maintenance cost is low.

8 Claims, 2 Drawing Sheets

(56) References Cited

U.S. PATENT DOCUMENTS 8,757,690 B2 * 6/2014 Gao ................. B25J 15/08
                                                                       294/198
2018/0105401 A1 * 4/2018 Tanaka ............. B25J 15/0047

FOREIGN PATENT DOCUMENTS

| CN | 108189070 A | * | 6/2018 |
| CN | 108450149 A | * | 8/2018 |

* cited by examiner

WHEEL HUB CARRYING MANIPULATOR

CROSS-REFERENCE TO RELATED APPLICATION

This application claims the priority to Chinese Patent Application No. 201910353227.7, entitled "Wheel Hub Carrying Manipulator", filed on Apr. 29, 2019, the entire content of which is hereby incorporated by reference.

TECHNICAL FIELD

The present disclosure relates to the technical field of mechanical carrying, and in particular relates to a wheel hub carrying manipulator.

BACKGROUND

With continuous development of the society, requirements on the efficiency of automobile production are higher, thus, how to improve the production efficiency of automobile parts is the goal that all automobile production companies want to solve and improve continuously. An automobile wheel hub is an important constituent part of automobile parts, along with growth of the automobile part industry, the wheel hub industry is gradually growing. Wheel hubs are divided into iron wheel hubs and steel wheel hubs according to materials, and the iron hubs and the steel hubs are more used in trucks and buses. Aluminum wheel hubs are commonly used in cars. Surface treatment of the wheel hubs comprises coating, electroplating and polishing. Automation of machining of wheel hubs and integration of machining and detection at the later stage are the main development trends of machining of wheel hubs at present. At present, the wheel hubs are developing in the directions of heavy load, high speed, high precision, high efficiency and the like, and are required to be small in size, light in weight, long in service life, safe and reliable.

For automatic production, it is necessary to realize mechanical automation for machining and production in the early stage and treatment work in the later stage of the wheel hubs, in order to realize assembly line operation, it is necessary to consider arrangement of an automatic carrying device which can greatly improve the production efficiency. At present, a carrying manipulator is adopted to realize automatic carrying, the structure and the control system are complex, and the maintenance cost is high.

SUMMARY

In view of this, the present disclosure aims to provide a wheel hub carrying manipulator which can realize assembly line operation and greatly improve the production efficiency, and is simple in structure and system and low in maintenance cost.

In order to achieve the above object, the technical solution of the present disclosure is realized as follows:

A wheel hub carrying manipulator comprises a stand column which is fixed in the vertical direction and a forearm driving device, and the forearm driving device is respectively hinged to an upper cantilever and a lower cantilever which are hinged to the stand column from top to bottom in the vertical direction; and a cantilever driving device capable of driving the upper cantilever and/or the lower cantilever to rotate around the stand column in the up-down direction; a forearm lever, one end of the forearm lever is connected with a forearm rotating mechanism, the other end of the forearm lever is connected with a claw hand driving device, and the forearm lever can stretch, retract and rotate under the driving effect of the forearm rotating mechanism; and a claw hand device, the claw hand device comprises a claw hand fixing component and a claw hand assembly, the claw hand fixing component is fixedly connected to the forearm lever, and the claw hand assembly is hinged to the claw hand fixing component. The upper portion of the claw hand assembly is hinged to one end of a connecting rod, the other end of the connecting rod is hinged to the claw hand driving device, and the claw hand driving device can drive the claw hand assembly to clamp and release a wheel hub through the connecting rod.

In an embodiment, the claw hand assembly comprises a first connecting rod, a second connecting rod, a third connecting rod, a fourth connecting rod and a fifth connecting rod, the first connecting rod is successively hinged to the connecting rod, the claw hand fixing component, the third connecting rod and the fourth connecting rod from top to bottom, the second connecting rod is positioned on the inner side of the first connecting rod, the upper portion and the lower portion of the second connecting rod are successively hinged to the fixing component and the third connecting rod, and the fifth connecting rod is positioned on the inner side of the second connecting rod, and is successively hinged to the third connecting rod and the fourth connecting rod from top to bottom.

In an embodiment, a chuck is hinged to the top of the fifth connecting rod.

In an embodiment, the forearm driving device comprises a forearm driving motor and a hydraulic cylinder II, the forearm rotating motor is hinged to the upper cantilever and the lower cantilever, a rotating shaft of the forearm rotating motor is fixedly connected with the hydraulic cylinder II, a piston rod of the hydraulic cylinder II is fixedly connected with the forearm lever, the forearm driving motor can drive the hydraulic cylinder II to drive the forearm lever to rotate, and the hydraulic cylinder II can drive the forearm lever to stretch and retract.

In an embodiment, the cantilever driving device is a hydraulic cylinder I, one end of a piston rod of the hydraulic cylinder I is hinged to the lower cantilever, and the other end of the hydraulic cylinder I is fixedly connected to the stand column.

In an embodiment, the claw hand driving device is a hydraulic cylinder III, one end of a piston rod of the hydraulic cylinder III is hinged to the connecting rod, and the other end of the hydraulic cylinder III is fixedly connected to the forearm lever.

In an embodiment, a control box body is fixed on the stand column, and the control box body can control the hydraulic cylinder I, the hydraulic cylinder II, the hydraulic cylinder III and the forearm rotating motor.

In an embodiment, a counterweight wheel is fixed at the end, which is away from the forearm driving device, of the lower cantilever.

In an embodiment, the claw hand fixing component comprises a claw hand fixed plate fixedly connected with the hydraulic cylinder III and claw hand moving plates which are perpendicular to the claw hand fixed plate and are downward, the claw hand moving plates are L-shaped, and are symmetrically fixed at two ends of the claw hand fixed plate, and the claw hand assembly is hinged to the claw hand moving plates.

Compared with the prior art, the wheel hub carrying manipulator in the present disclosure has the following advantages:

(1) The structure is simple, parts are fewer, and maintenance is convenient.

(2) Disassembling and assembling are convenient, and changing of a working position, movement and transportation and fixation of the wheel hub carrying manipulator on the ground are convenient.

(3) A wheel hub is clamped to ascend and descend and is released by the aid of hydraulic pressure, and control is convenient.

(4) A rotating process of a clamping device portion from an angle of 0 degree to an angle of 180 degrees is realized by the aid of power of a motor, and the process is stable.

(5) When the clamping device for clamping the wheel hub is positioned at an angle of 0 degree or an angle of 180 degrees, the wheel hub is completely in a horizontal state.

(6) The occupation area is small, and the wheel hub carrying manipulator is reliable to use.

BRIEF DESCRIPTION OF THE DRAWINGS

The accompanying drawings, which are incorporated in and constitute a part of the present disclosure, provide a further understanding of the present disclosure, and schematic embodiments and the description thereof serve to explain the present disclosure and are not to be construed as unduly limiting the present disclosure. In the drawings.

Figure 1:
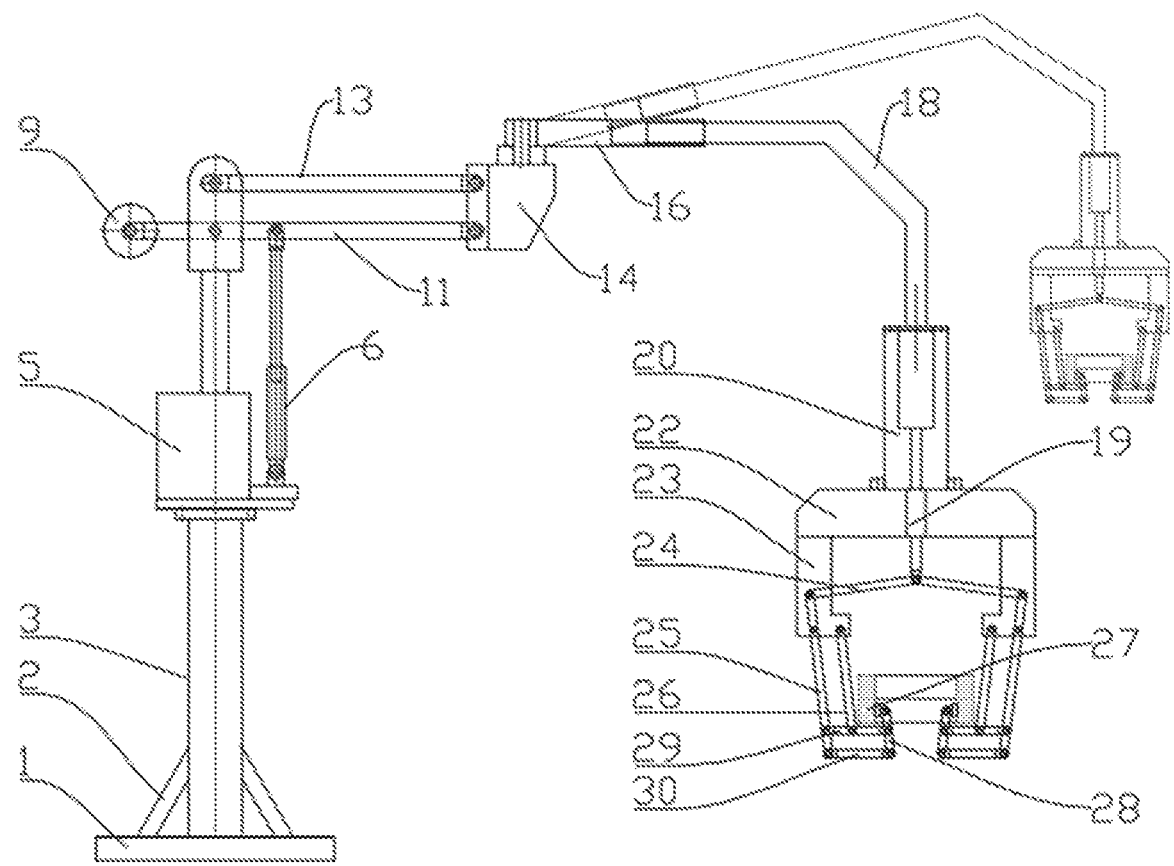
FIG. 1 is a schematic view of a wheel hub carrying manipulator according to some embodiment of the present disclosure.

Reference numerals: 1—bottom plate; 2—rib plate; 3—stand column; 5—hydraulic control box body; 6—hydraulic cylinder I; 9—counterweight wheel; 11—lower cantilever; 13—upper cantilever; 14—forearm rotating motor; 16—hydraulic cylinder II; 18—forearm lever; 19—hydraulic cylinder III; 20—claw hand control box; 22—claw hand fixed plate; 23—claw hand moving plate; 24 connecting rod; 25—first connecting rod; 26—second connecting rod; 27—chuck; 28—fifth connecting rod; 29—third connecting rod; and 30—fourth connecting rod.

DETAILED DESCRIPTION

It should be noted that embodiments of the present disclosure and features of the embodiments may be combined with one another without conflict.

The technical solution of the present disclosure will be described clearly and completely hereinafter with reference to the accompanying drawings in combination with embodiments, and obviously, the embodiments described are only a part of embodiments of the present disclosure, and are not all of embodiments thereof. Based on the embodiments of the present disclosure, all other embodiments obtained by a person of ordinary skill in the art without involving any inventive effort are within the scope of protection of the present disclosure.

A wheel hub carrying manipulator according to embodiments of the present disclosure will be described hereinafter with reference to FIG. 1 to FIG. 2 in conjunction with embodiments.

Figure 2:
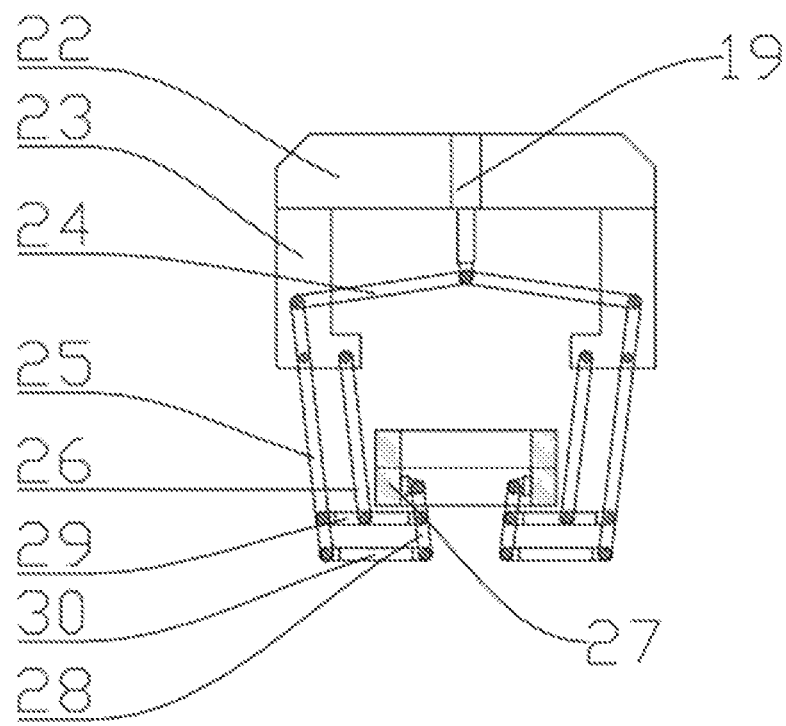
FIG. 2 illustrates a front view of a claw hand of the wheel hub carrying manipulator.

The wheel hub carrying manipulator as shown in FIG. 1 to FIG. 2 includes a stand column 3 fixed in the vertical direction and a forearm driving device, the stand column 3 is fixed on a bottom plate 1 through rib plates 2, and the forearm driving device is respectively hinged to an upper cantilever 13 and a lower cantilever 11 which are hinged to the stand column 3 from top to bottom in the vertical direction; and the upper cantilever 13 and the lower cantilever 11 are fixed on the stand column 3 and the forearm driving device in the vertical direction.

The wheel hub carrying manipulator includes a cantilever driving device capable of driving the upper cantilever 13 and/or the lower cantilever 11 to rotate around the stand column 3 in the up-down direction; and the upper cantilever 13, the lower cantilever 11, the stand column 3 and the forearm driving device form a four-rod linkage device, the cantilever driving device can drive the forearm driving device to stably move in the up-down direction by driving the upper cantilever 13 and/or the lower cantilever 11 to rotate around the stand column 3 in the up-down direction.

The wheel hub carrying manipulator further includes a forearm lever 18, one end of the forearm lever 18 is connected with the forearm rotating mechanism 14, the other end of the forearm lever 18 is connected with a claw hand driving device 20, and the forearm lever 18 can stretch, retract and rotate under the driving effect of the forearm rotating mechanism 14; and a claw hand device, the claw hand device includes a claw hand fixing component and a claw hand assembly, the claw hand fixing component is fixedly connected to the forearm lever 18, and the claw hand assembly is hinged to the claw hand fixing component. The upper portion of the claw hand assembly is hinged to one end of a connecting rod 24, the other end of the connecting rod 24 is hinged to the claw hand driving device, and the claw hand driving device can drive the claw hand assembly to clamp and release a wheel hub through the connecting rod 24.

In some embodiment, the claw hand assembly includes a first connecting rod 25, a second connecting rod 26, a third connecting rod 29, a fourth connecting rod 30 and a fifth connecting rod 28. The first connecting rod 25 is successively hinged to the connecting rod 24, the claw hand fixing component, the third connecting rod 29 and the fourth connecting rod 30 from top to bottom; and the second connecting rod 26 is positioned on the inner side of the first connecting rod 25, the upper portion and the lower portion of the second connecting rod 26 are successively hinged to the fixing component and the third connecting rod 29, and the fifth connecting rod 28 is positioned on the inner side of the second connecting rod 26, and is successively hinged to the third connecting rod 29 and the fourth connecting rod 30 from top to bottom.

The first connecting rod 25, the second connecting rod 26, the third connecting rod 29 and the claw hand fixing component form a first four-rod linkage mechanism, the first connecting rod 25, the third connecting rod 29, the fourth connecting rod 30 and the fifth connecting rod 28 form a second four-rod linkage mechanism, the claw hand driving device drives the first connecting rod 25 to rotate around the claw hand fixing component through the connecting rod 24 so as to drive the second four-rod linkage mechanism to move horizontally and stably, and stable clamping and releasing of a wheel hub are realized.

In some embodiments, the top of the fifth connecting rod 28 is hinged to a chuck 27, and the chuck is generally made from a rubber material, has a certain anti-slipping property and prevents the wheel hub from being scratched.

In some embodiments, the forearm driving device includes a forearm driving motor 14 and a hydraulic cylinder II 16, the forearm rotating motor 14 is hinged to the upper cantilever 13 and the lower cantilever 11, a rotating shaft of the forearm rotating motor 14 is fixedly connected with the hydraulic cylinder II 16, a piston rod of the hydraulic cylinder II 16 is fixedly connected with the forearm lever 18, the forearm rotating motor 14 can drive the hydraulic cylinder II 16 to drive the forearm lever 18 to rotate, and the hydraulic cylinder II 16 can drive the forearm lever 18 to stretch and retract.

In some embodiment, the cantilever driving device is a hydraulic cylinder I 6, one end of a piston rod of the hydraulic cylinder I 6 is hinged to the lower cantilever 11, and the other end of the hydraulic cylinder I 6 is fixedly connected to the stand column 3.

In some embodiment, the claw hand driving device is a hydraulic cylinder III 19, one end of a piston rod of the hydraulic cylinder III 19 is hinged to a connecting rod 24, and the other end of the hydraulic cylinder III 19 is fixedly connected to the forearm lever 18.

Ascending and descending actions of a carrying device are realized by controlling the hydraulic cylinder I 6, so that a certain vertical distance is maintained between the manipulator and the wheel hub on a cableway, then stretching and retracting of the forearm lever 18 are controlled through the hydraulic cylinder II 16, the manipulator translates to enter the cavity of the wheel hub on the cableway, the hydraulic cylinder III 19 is driven to enable a clamping device of the manipulator to support the inner wall of the wheel hub so as to implement clamping and fixing actions, then the hydraulic cylinder I 6 is controlled to ascend a manipulator arm to a certain height, the forearm rotating motor 14 drives the manipulator which clamps the wheel hub to rotate at a certain angle, the wheel hub is carried to another position to implement a wheel hub carrying action, finally, the clamping action of the manipulator is released, the manipulator is withdrawn, and the whole mechanism returns to the initial position.

In some embodiment, a control box body 5 is fixed on the stand column 3, and the control box body 5 can control the hydraulic cylinder I 6, the hydraulic cylinder II 16, the hydraulic cylinder III 19 and the forearm rotating motor 14.

In some embodiment, a counterweight wheel 9 is fixed at the end, which is away from the forearm rotating device, of the lower cantilever 11.

In some embodiment, the claw hand fixing component includes a claw hand fixed plate 22 fixedly connected with the hydraulic cylinder III 19 and claw hand moving plates 23 which are perpendicular to the claw hand fixed plate 22 and are downward, the claw hand moving plates 23 are L-shaped and are symmetrically fixed at two ends of the claw hand fixed plate 22, and the claw hand assembly is hinged to the claw hand moving plates 23.

Compared with the prior art, the wheel hub carrying manipulator in the present disclosure has the following advantages:

(1) The structure is simple, parts are fewer, and maintenance is convenient.

(2) Disassembling and assembling are convenient, and changing of a working position, movement and transportation and fixation of the wheel hub carrying manipulator on the ground are convenient.

(3) A wheel hub is clamped to ascend and descend and is released by the aid of hydraulic pressure, and control is convenient.

(4) A rotating process of a clamping device portion from an angle of 0 degree to an angle of 180 degrees is realized by the aid of power of a motor, and the process is stable.

(5) When the clamping device for clamping the wheel hub is positioned at an angle of 0 degree or an angle of 180 degrees, the wheel hub is completely in a horizontal state.

(6) The occupation area is small, and the wheel hub carrying manipulator is reliable to use.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. A wheel hub carrying manipulator, comprising:
a stand column which is fixed in the vertical direction and a forearm driving device, wherein the forearm driving device is respectively hinged to an upper cantilever and a lower cantilever which are hinged to the stand column from top to bottom in the vertical direction;
a cantilever driving device capable of driving the upper cantilever and/or the lower cantilever to rotate around the stand column in the up-down direction;
a forearm lever, wherein one end of the forearm lever is connected with the forearm driving device, the other end of the forearm lever is connected with a claw hand driving device, and the forearm lever can stretch, retract and rotate under the driving effect of the forearm driving device; and
a claw hand device, wherein the claw hand device comprises: a claw hand fixing component and a claw hand assembly, the claw hand fixing component is fixedly connected to the forearm lever, and the claw hand assembly is hinged to the claw hand fixing component; and an upper portion of the claw hand assembly is hinged to one end of a connecting rod, the other end of the connecting rod is hinged to the claw hand driving device, and the claw hand driving device can drive the claw hand assembly to clamp a wheel hub by supporting the inner wall of the wheel hub and release the wheel hub through the connecting rod,
wherein the claw hand assembly includes:
a first connecting rod,
a second connecting rod,
a third connecting rod,
a fourth connecting rod, and
a fifth connecting rod,
the first connecting rod is successively hinged to the connecting rod, the claw hand fixing component, the third connecting rod and the fourth connecting rod from top to bottom,
the second connecting rod is positioned on the inner side of the first connecting rod, an upper portion and a lower portion of the second connecting rod are successively hinged to the fixing component and the third connecting rod, and
the fifth connecting rod is positioned on the inner side of the second connecting rod, and is successively hinged to the third connecting rod and the fourth connecting rod from top to bottom,
the first connecting rod, the second connecting rod, the third connecting rod and the claw hand fixing component form a first four-rod linkage mechanism,
the first connecting rod, the third connecting rod, the fourth connecting rod and the fifth connecting rod form a second four-rod linkage mechanism, the claw hand driving device drives the first connecting rod to rotate around the claw hand fixing component through the connecting rod so as to drive the second four-rod linkage mechanism to move horizontally and stably.

2. The wheel hub carrying manipulator according to claim 1, wherein top of the fifth connecting rod is hinged to a chuck.

3. The wheel hub carrying manipulator according to claim 2, wherein the forearm driving device comprises:
   a forearm rotating motor, and
   a second hydraulic cylinder,
   the forearm rotating motor is hinged to the upper cantilever and the lower cantilever, a rotating shaft of the forearm rotating motor is fixedly connected with the second hydraulic cylinder, a piston rod of the second hydraulic cylinder is fixedly connected with the forearm lever, the forearm rotating motor can drive the second hydraulic cylinder to drive the forearm lever to rotate, and the second hydraulic cylinder can drive the forearm lever to stretch and retract.

4. The wheel hub carrying manipulator according to claim 3, wherein the cantilever driving device is a first hydraulic cylinder, one end of a piston rod of the first hydraulic cylinder is hinged to the lower cantilever, and the other end of the first hydraulic cylinder is fixedly connected to the stand column.

5. The wheel hub carrying manipulator according to claim 4, wherein the claw hand driving device is a third hydraulic cylinder, one end of a piston rod of the third hydraulic cylinder is hinged to the connecting rod, and the other end of the third hydraulic cylinder is fixedly connected to the forearm lever.

6. The wheel hub carrying manipulator according to claim 5, wherein: a control box body is fixed on the stand column; and the control box body can control the first hydraulic cylinder, the second hydraulic cylinder, the third hydraulic cylinder and the forearm rotating motor.

7. The wheel hub carrying manipulator according to claim 5, wherein a counterweight wheel is fixed at the end of the lower cantilever, which is away from the forearm driving device.

8. The wheel hub carrying manipulator according to claim 5, wherein the claw hand fixing component comprises:
   a claw hand fixed plate fixedly connected to the third hydraulic cylinder, and
   claw hand moving plates which are perpendicular to the claw hand fixed plate and are below the claw hand fixed plate,
   the claw hand moving plates are L-shaped, and are symmetrically fixed at two ends of the claw hand fixed plate, and the claw hand assembly is hinged to the claw hand moving plates.

* * * * *